(12) United States Patent
Koo et al.

(10) Patent No.: US 11,061,607 B2
(45) Date of Patent: Jul. 13, 2021

(54) ELECTRONIC SYSTEM HAVING HOST AND MEMORY CONTROLLER, AND OPERATING METHOD THEREOF

(71) Applicant: SK hynix Inc., Gyeonggi-do (KR)

(72) Inventors: Duck Hoi Koo, Gyeonggi-do (KR); Yong Jin, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 116 days.

(21) Appl. No.: 16/114,722

(22) Filed: Aug. 28, 2018

(65) Prior Publication Data

US 2019/0235790 A1    Aug. 1, 2019

(30) Foreign Application Priority Data

Feb. 1, 2018    (KR) .................. 10-2018-0012908

(51) Int. Cl.
*G06F 3/06* (2006.01)
*G06F 21/74* (2013.01)
*G06F 21/78* (2013.01)

(52) U.S. Cl.
CPC .......... *G06F 3/0659* (2013.01); *G06F 3/0679* (2013.01); *G06F 21/74* (2013.01); *G06F 21/78* (2013.01)

(58) Field of Classification Search
CPC ...... G06F 3/0679; G06F 3/0659; G06F 21/74; G06F 21/78
USPC ........................................................ 711/156
See application file for complete search history.

(56) References Cited

U.S. PATENT DOCUMENTS

| 10,235,309 B1* | 3/2019 | Markus ................. G06F 3/0611 |
| 2015/0058532 A1 | 2/2015 | Sugimoto et al. |
| 2017/0075694 A1 | 3/2017 | Kondo et al. |
| 2018/0150242 A1* | 5/2018 | Yi ........................... G06F 3/061 |
| 2018/0373450 A1* | 12/2018 | Ji .......................... G06F 3/0611 |

* cited by examiner

*Primary Examiner* — Hua J Song
(74) *Attorney, Agent, or Firm* — IP & T Group LLP (57) ABSTRACT

There are provided an electronic system and an operating method thereof. The electronic system includes: a host for queuing an external command to wait or to be output, based on a status of dies included in a storage device; a central processing unit for generating a command for controlling the storage device in response to a request received from the host or the external command; and a controller memory buffer for storing status information indicating whether the dies are in a status in which access is possible or a status in which access is impossible, wherein the central processing unit receives status information of the dies from the storage device, and stores status information matched to each of the dies in the controller memory buffer.

20 Claims, 6 Drawing Sheets

ELECTRONIC SYSTEM HAVING HOST AND MEMORY CONTROLLER, AND OPERATING METHOD THEREOF

CROSS-REFERENCE TO RELATED APPLICATION

The present application claims priority to Korean patent application number 10-2018-0012908, filed on Feb. 1, 2018, which is incorporated herein by reference in its entirety.

BACKGROUND

1. Field of Invention

The present disclosure generally relates to an electronic system having a host and a memory controller, and an operating method thereof, and more particularly, to an electronic system having a host and a memory controller, which can efficiently manage a command queue between a memory system and the host, and an operating method of the electronic system.

2. Description of Related Art

An electronic system may include a memory system for storing data and a host for controlling the memory system.

The memory system may include a storage device and a memory controller.

The storage device may include a plurality of memory devices, and the memory devices may store data or output stored data. For example, the memory devices may be configured as volatile memory devices in which stored data is extinguished when power supply is interrupted, or be configured as nonvolatile memory devices in which stored data is retained even when power supply is interrupted.

The memory controller may control data communication between the host and the storage device.

The host may communicate with the storage device through the memory controller by using an interface protocol such as Peripheral Component Interconnect-Express (PCI-E), Advanced Technology Attachment (ATA), Serial ATA (SATA), Parallel ATA (PATA), or Serial Attached SCSI (SAS). Interface protocols between the host and the memory system are not limited to the above-described examples, and may include various interface protocols such as a Universal Serial Bus (USB), a Multi-Media Card (MMC), an Enhanced Small Disk Interface (ESDI), and Integrated Drive Electronics (IDE).

SUMMARY

Embodiments provide an electronic system having a host and a memory controller, which can efficiently manage a command queue between a memory system and the host, and an operating method of the electronic system.

According to an aspect of the present disclosure, there is provided an electronic system including: a host configured to queue an external command to wait or to be output, based on a status of dies included in a storage device; a central processing unit configured to generate a command for controlling the storage device in response to a request received from the host or the external command; and a controller memory buffer configured to store status information indicating whether the dies are in a status in which access is possible or a status in which access is impossible, wherein the central processing unit receives status information of the dies from the storage device, and stores status information matched to each of the dies in the controller memory buffer.

According to an aspect of the present disclosure, there is provided an electronic system including: a storage device configured to include a plurality of dies for storing data; a host configured to output a request or an external command, based on a status of the storage device; and a memory controller configured to control the storage device in response to the request or the external command, which is received from the host, wherein the memory controller includes a controller memory buffer configured to store status information of each of the dies and output the status information of a selected die among the dies to the host in response to a status check request received from the host.

According to an aspect of the present disclosure, there is provided a method for operating an electronic system, the method including: when a status check request is received, storing status information of a selected die in a controller memory buffer; transmitting the status information to a host; when busy status data is included in the status information stored in the host, the host queues an external command to wait until the selected die is in an idle status; when the selected die is in the idle status, outputting the external command from the host; changing the status information stored in the controller memory buffer in response to the external command, and allowing the selected die to operate; and when the operation of the selected die is completed, re-changing the status information stored in the controller memory buffer.

According to an aspect of the present disclosure, there is provided an electronic system including: a host including a host buffer suitable for storing die status information, and the host suitable for selectively providing an operation request according to the die status information; a storage device including one or more dies; and a controller including a controller buffer suitable for storing the die status information, and the controller suitable for: controlling, in response to the operation request, the storage device to perform an operation to a target die among the dies while marking the die status information corresponding to the target die as busy in the controller buffer during the operation; and transferring, in response to a status request provided from the host, the die status information from the controller buffer to the host buffer by controlling the storage device to provide the controller buffer with the die status information.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive.

In the entire specification, when an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Figure 1:
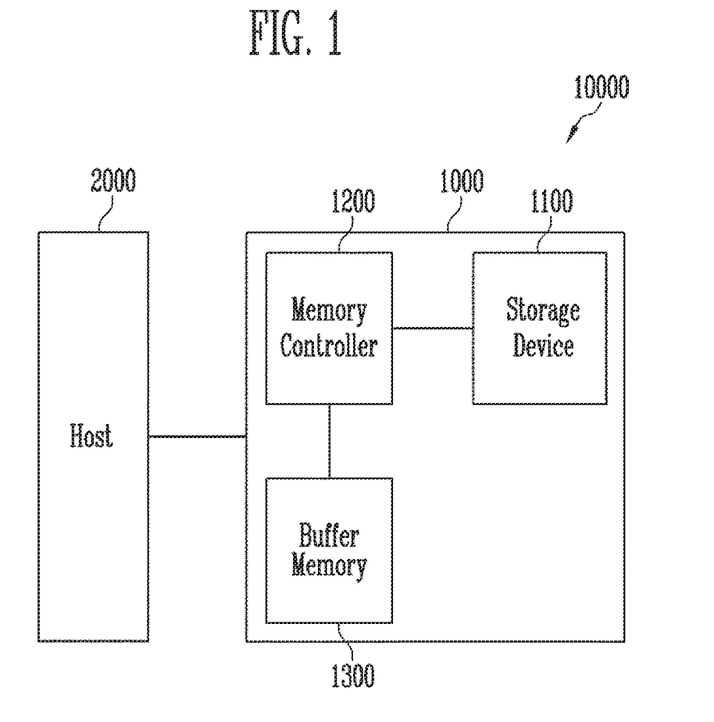
FIG. 1 is a diagram illustrating an electronic system in accordance with an embodiment of the present disclosure.

FIG. 1 is a diagram illustrating an electronic system according to an embodiment of the present disclosure.

Referring to FIG. 1, the electronic system 10000 may include a memory system 1000 for storing data and a host 2000 for controlling the memory system 1000.

The memory system 1000 may include a storage device 1100 for storing data, a buffer memory 1300 for temporarily storing data, and a memory controller 1200 for controlling the storage device 1100 and the buffer memory 1300 under the control of the host 2000.

The host 2000 may communicate with the memory system 1000, using at least one of various communication manners, such as a Universal Serial Bus (USB), a Serial AT Attachment (SATA), a High Speed InterChip (HSIC), a Small Computer System Interface (SCSI), Firewire, a Peripheral Component Interconnection (PCI), a PCI Express (PCIe), a NonVolatile Memory Express (NVMe), a Universal Flash Storage (UFS), a Secure Digital (SD), a MultiMedia card (MMC), an Embedded MMC (eMMC), a Dual In-line Memory Module (DIMM), a Registered DIMM (RDIMM), a Load Reduced DIMM (LRDIMM), and the like.

The memory controller 1200 may control overall operations of the memory system 1000, and control data exchange between the host 2000 and the storage device 1100. For example, the memory controller 1200 may program or read data by controlling the storage device 1100 in response to a request of the host 2000. Also, the memory controller 1200 may store information of main memory blocks and sub-memory blocks, which are included in the storage device 1100, and select the storage device 1100 such that perform a program operation on a main memory block or a sub-memory block according to the amount of data loaded for the program operation. In some embodiments, the storage device 1100 may include a flash memory.

The memory controller 1200 may control data exchange between the host 2000 and the buffer memory 1300 or temporarily store system data for controlling the storage device 1100 in the buffer memory 1300. The buffer memory 1300 may be used as a working memory, a cache memory, or a buffer memory of the memory controller 1200. The buffer memory 1300 may store codes and commands, which are executed by the memory controller 1200. Also, the buffer memory 1300 may store data processed by the memory controller 1200.

The memory controller 1200 may temporarily store data input from the host 200 in the buffer memory 1300 and then transmit the data temporarily stored in the buffer memory 1300 to the storage device 1100 to be stored in the storage device 1100. Also, the memory controller 1200 may receive data and a logical address, which are input from the host 2000, and translate the logical address to a physical address indicating an area in which data is to be actually stored in the storage device 1100. Also, the memory controller 1200 may store, in the buffer memory 1300, a logical-to-physical address mapping table that establishes a mapping relationship between the logical address and the physical address.

In some embodiments, the buffer memory 1300 may include a Double Data Rate Synchronous Dynamic Random Access Memory (DDR SDRAM), a Low Power Double Data Rate 4 (LPDDR4) SDRAM, a Graphics Double Data Rate (GDDR) SDRAM, a Low Power DDR (LPDDR), a Rambus Dynamic Random Access Memory (RDRAM), etc.

Figure 2:
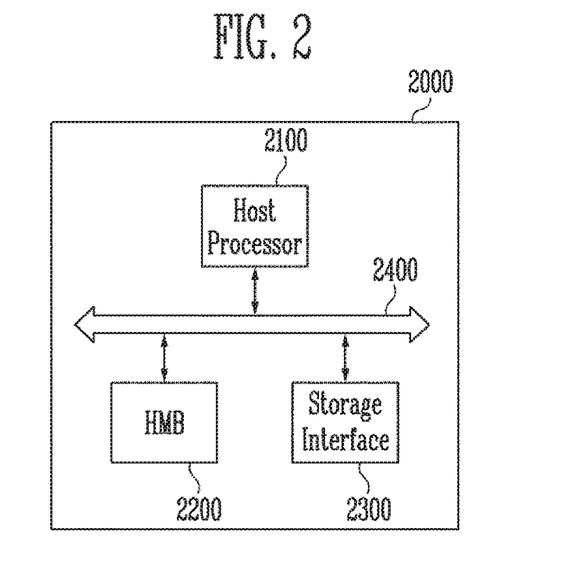
FIG. 2 is a diagram illustrating in detail a host of FIG. 1.

FIG. 2 is a diagram illustrating in detail the host 2000 of FIG. 1.

Referring to FIG. 2, the host 2000 may include a host processor 2100, a host memory buffer (HMB) 2200, and a storage interface 2300. The host processor 2100, the HMB 2200, and the storage interface 2300 may communicate each other through a bus 2400.

The host processor 2100 may generate a program request for a program operation of the memory system 1000, a read request for a read operation of the memory system 1000, or the like. For example, the program request may include a program external command and a physical address, which are transmitted to the memory system 1000. For example, the read request may include a read external command and a physical address, which are transmitted to the memory system 1000. In addition, the host processor 2100 may control an operation of transmitting various operation requests such as an erase request, firmware, and the like to the memory system 1000. For example, the host processor 2100 may control a command queue to be transmitted to the memory system 1000. For example, the host processor 2100 may control the command queue, based on information stored in the HMB 2200. For example, the host processor 2100 may be configured to, based on the information stored in the HMB 2200, not to output an external command but to wait when any idle memory device does not exist in the memory system 1000, and to output the external command when an idle memory device exists in the memory system 1000. The HMB 2200 may store status information of the storage device 1100 included in the memory system 1000. For example, the HMB 2200 may store information on a current status of dies constituting the storage device 1100. For example, the HMB 2200 may store information on whether the dies are in an idle status in which access is currently possible or a busy status in which access is impossible. For example, when status information of the dies is received from the memory system 1000, the host processor 2100 may update the status information of the dies, which is stored in the host memory buffer 2200.

The storage interface 2300 may communicate with the memory system 1000 by using an interface protocol such as a Peripheral Component Interconnect Express (PCIe), an Advanced Technology Attachment (ATA), a Serial ATA (SATA), a Parallel ATA (PATA), a Serial Attached SCSI (SAS) or a Non-Volatile Memory Express (NVMe). The storage interface 2300 is not limited to the above-described example, and may include various interfaces such as a Universal Serial Bus (USB), a Multi-Media Card (MMC), an Enhanced Small Disk Interface (ESDI), and an Integrated Drive Electronics (IDE). For example, the host 2000 and the memory system 1000 may communicate with each other through the storage interface 2300.

Figure 3:
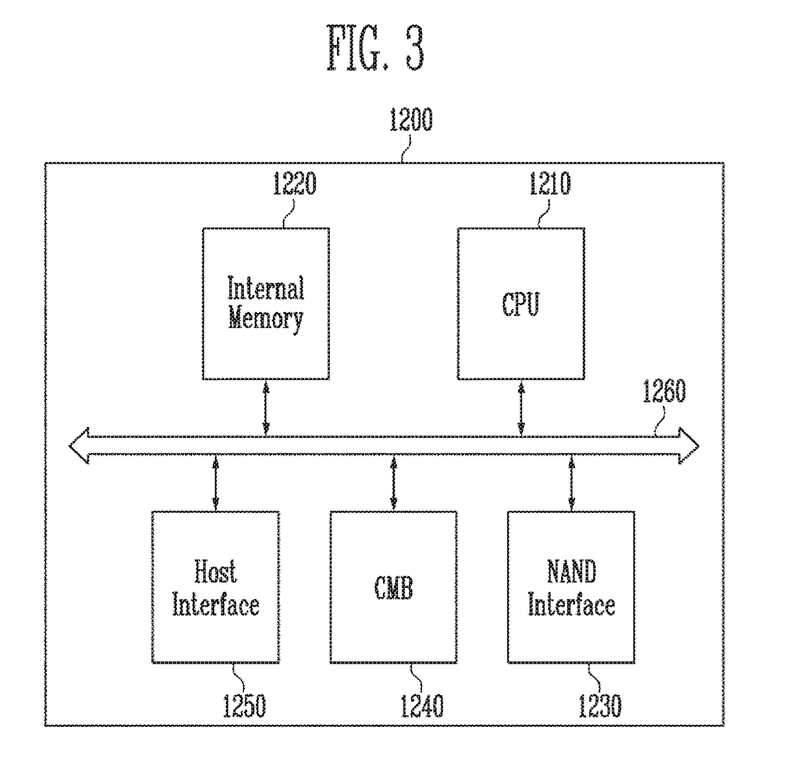
FIG. 3 is a diagram illustrating in detail a memory controller of FIG. 1.

FIG. 3 is a diagram illustrating in detail the memory controller 1200 of FIG. 1.

Referring to FIG. 3, the memory controller 1200 may include a central processing unit (CPU) 1210, an internal memory 1220, a NAND interface 1230, a controller memory buffer (CMB) 1240, and a host interface 1250 so as to control communication between the host 2000 and the storage device 1100.

The CPU 1210 may perform various calculations for controlling the storage device 1100, generate a command and an address, or perform firmware. When a request is received from the host 2000, the CPU 1210 may generate a command in response to the received request, store status information of dies included in the storage device 1100 in the CMB 1240, or transmit the status information to the host 2000. Also, the CPU 1210 may temporarily change the status information stored in the CMB 1240 and allow the storage device 1100 to perform an operation, in response to an external command received from the host 2000. Also, when the operation of the storage device 1100 is ended, the CPU 1210 may recover the changed status information.

The internal memory 1220 may store various system information required to perform an operation of the memory controller 1200. For example, the internal memory 1220 may be implemented with an SRAM. The internal memory 1220 may include tables for storing various system information required to perform an operation of the memory system 1000. Address mapping information may be stored in the internal memory 1220. For example, the internal memory 1220 may store a mapping table of a logical address received from the host 2000 and a physical address of the storage device 1100.

The NAND interface 1230 may be configured to communicate with the storage device 1100 under the control of the CPU 1210. NAND interface 1230 may communicate a command, an address, and data with the storage device 1100 through a channel.

The CMB 1240 may store addresses of dies included in the storage device 1100 and status information of each die.

The host interface 1250 may be configured to communicate with the external host 2000 coupled to the memory system 1000 under the control of the CPU 1210. For example, the host interface 1250 may receive, from the host 2000, a program external command, data, and a logical address corresponding to the program external command. Also, the host interface 1250 may receive, from the host 2000, a read external command and a logical address corresponding to the read external command.

Figure 4:
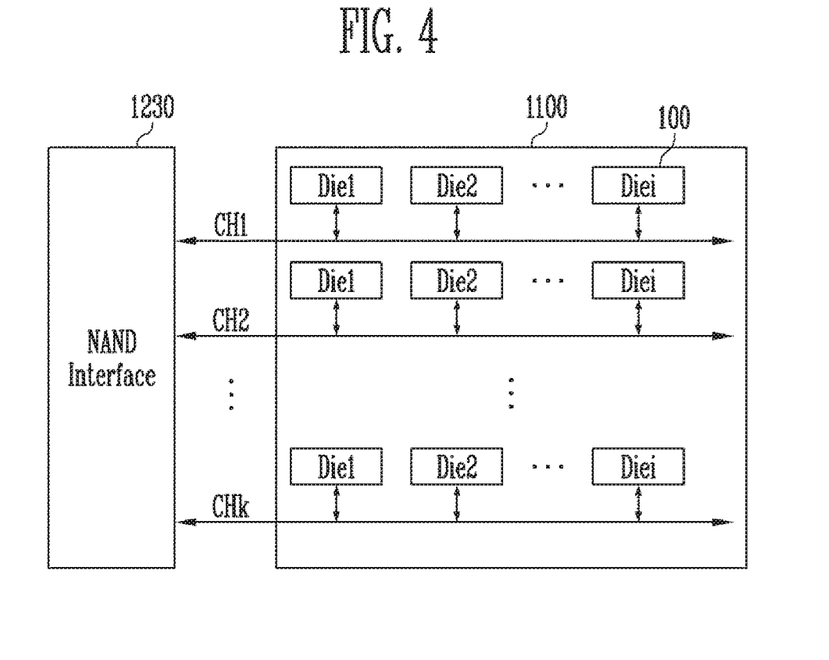
FIG. 4 is a diagram illustrating in detail a storage device of FIG. 1.

FIG. 4 is a diagram illustrating in detail the storage device of FIG. 1.

Referring to FIG. 4, the storage device 1100 may include a plurality of dies 100. For example, a Solid State Drive (SSD) may include a plurality of dies 100 for storing data. The dies 100 may communicate with the NAND interface 1230 through channels CH1 to CHk. For example, first to kth channels CH1 to CHk may be coupled to the NAND interface 1230, and a plurality of dies 100 may be coupled to each of the first to kth channels CH1 to CHk. Dies 100 coupled to the same channel cannot simultaneously operate, but dies 100 coupled to different channels can simultaneously operate. Thus, commands can be sequentially transmitted to dies 100 coupled to the same channel along a command queue.

Figure 5:
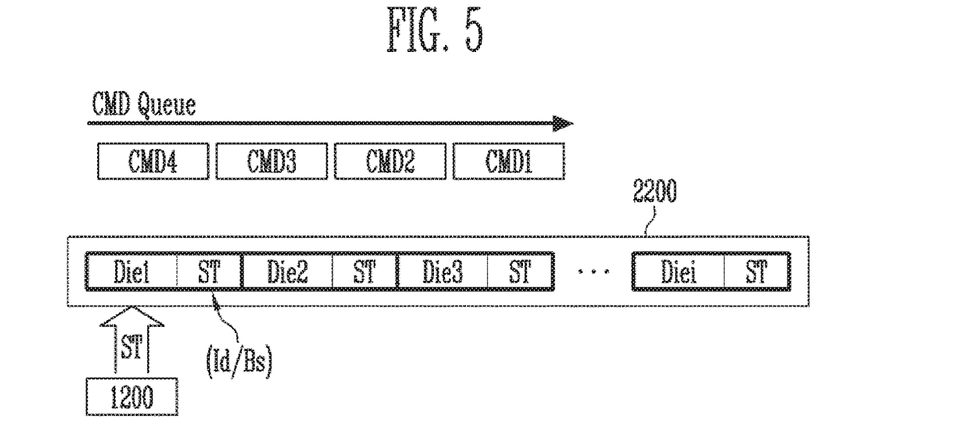
FIG. 5 is a diagram illustrating information stored in a host memory buffer.

FIG. 5 is a diagram illustrating information stored in the HMB 2200.

Referring to FIG. 5, addresses of dies and status information ST of each die may be stored in the HMB 2200. For example, when status information ST transmitted from the memory controller 1200 is received to the host 2000, the received status information ST may be stored in the HMB 2200 included in the host 2000. The status information ST may be stored in each of dies Die1 to Diei ('i' is a positive integer).

For example, an address of a first die Die1 and status information ST of the first die Die1 may be matched and stored in the HMB 2200, and an address of a second die Die2 and status information ST of the second die Die2 may be matched and stored in the HMB 2200. In this manner, an address of an i-th die Diei and status information ST of the i-th die Diei may be matched and stored in the HMB 2200.

In addition, when status information ST of a specific die is received from the memory controller 1200, the status information ST of the corresponding die of the HMB 2200 may be updated. The status information ST may include information whether the current status of a die Die is an idle status or a busy status. For example, when the first die Die1 is currently in the idle status, the status information ST of the first die Die1 may include idle status data Id. When the second die Die2 is currently under operation, the status information ST of the second die Die2 may include busy status data Bs.

The host processor (2100 of FIG. 2) may allow an external command CMD, which is queued in command queue CMD Queue, to wait or to be output to the memory system 1000. For example, before the external command CMD is output, the host processor 2100 may check status information ST of a selected die, which is stored in the HMB 2200, and allow the external command CMD to wait in the command queue CMD Queue or to be output to the memory system 1000 according to the status information ST of the selected die.

For example, when a die Die to perform an operation in response to an external command CMD is in the idle status, the host processor 2100 may output the external command CMD to the memory system 1000. When a die to perform an external command CMD is in the busy status, the host processor 2100 may allow the corresponding external command to wait in the command queue CMD Queue for a moment.

For example, when a die to perform an operation in response to a first external command CMD1 is currently in the idle status, the host 2000 may output the first external command CMD1. However, when a die to perform an operation in response to a second external command CMD is currently in the busy status, the host 2000 may allow the second external command CMD2 to wait in the command queue CMD Queue until the status of the corresponding die becomes the idle status.

In order to check a current status of the selected die, the host processor 2100 may output a status check request to the memory controller 1200. When the status check request is received from the host processor 2100, the memory controller 1200 may check the current status of the selected die, and transmit status information ST of the selected die to the host 2000.

Figure 6:
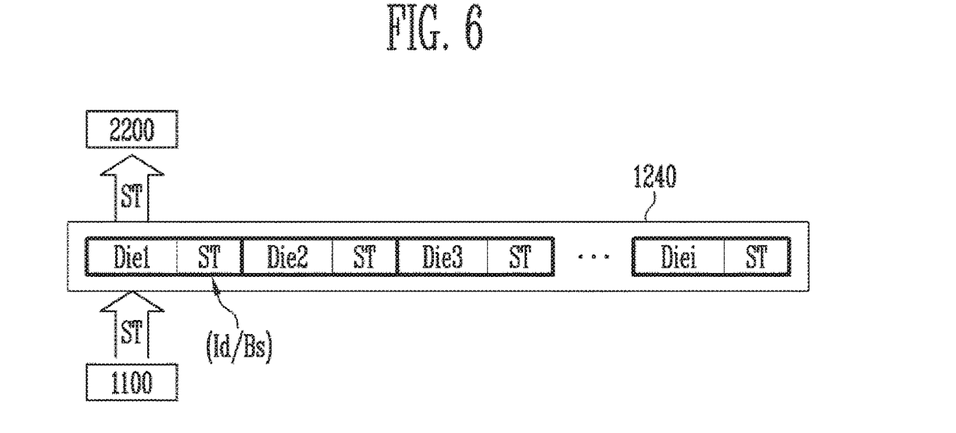
FIG. 6 is a diagram illustrating information stored in a controller memory buffer.

FIG. 6 is a diagram illustrating information stored in the CMB 1240.

Referring to FIG. 6, addresses of dies and status information ST of each of the dies may be stored in the CMB 1240. For example, when a status check request is received from the host 2000, the CPU (1210 of FIG. 3) of the memory controller (1200 of FIG. 3) may receive status information ST of a selected die from the storage device 1100. The received status information ST may be idle status data Id or busy status data Bs.

Subsequently, the CPU 1210 may transmit the status information of the selected die to the host 2000. The status information ST transmitted to the host 2000 may be matched to the selected die of the HMB 2200 included in the host 2000, and be stored in the HMB 2200.

Figure 7:
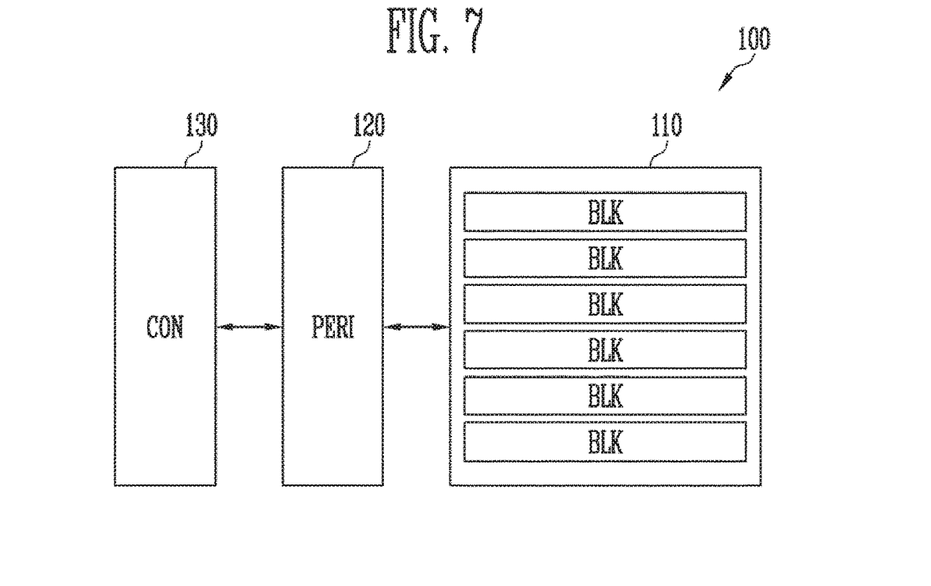
FIG. 7 is a diagram illustrating a memory device.

FIG. 7 is a diagram illustrating a memory device.

Referring to FIG. 7, the storage device (1100 of FIG. 4) includes a plurality of dies 100. Each of the dies 100 may be configured with a memory device. The dies 100 may be configured identically to one another, and therefore, a memory device constituting any one die 100 will be described as an example.

The memory device may include a memory cell array 110 for storing data, peripheral circuits (PERI) 120 configured to perform various operations such as program, read, and erase operations, and a control logic (CON) 130 for controlling the peripheral circuits 120.

The memory cell array 110 may include a plurality of memory blocks BLK. The peripheral circuits 120 may perform a program, read or erase operation on a selected memory block BLK among the memory blocks BLK under the control of the control logic 130. A NAND flash memory will be described as an example. Each of the memory blocks BLK includes a plurality of pages, and a plurality of memory cells may be coupled to each page. The NAND flash memory device may operate in units of pages in the program or read operation, and operate in units of blocks in the erase operation.

An operating method between the storage device 1100, the memory controller 1200, and the host 2000 will be described as follows.

Figure 8:
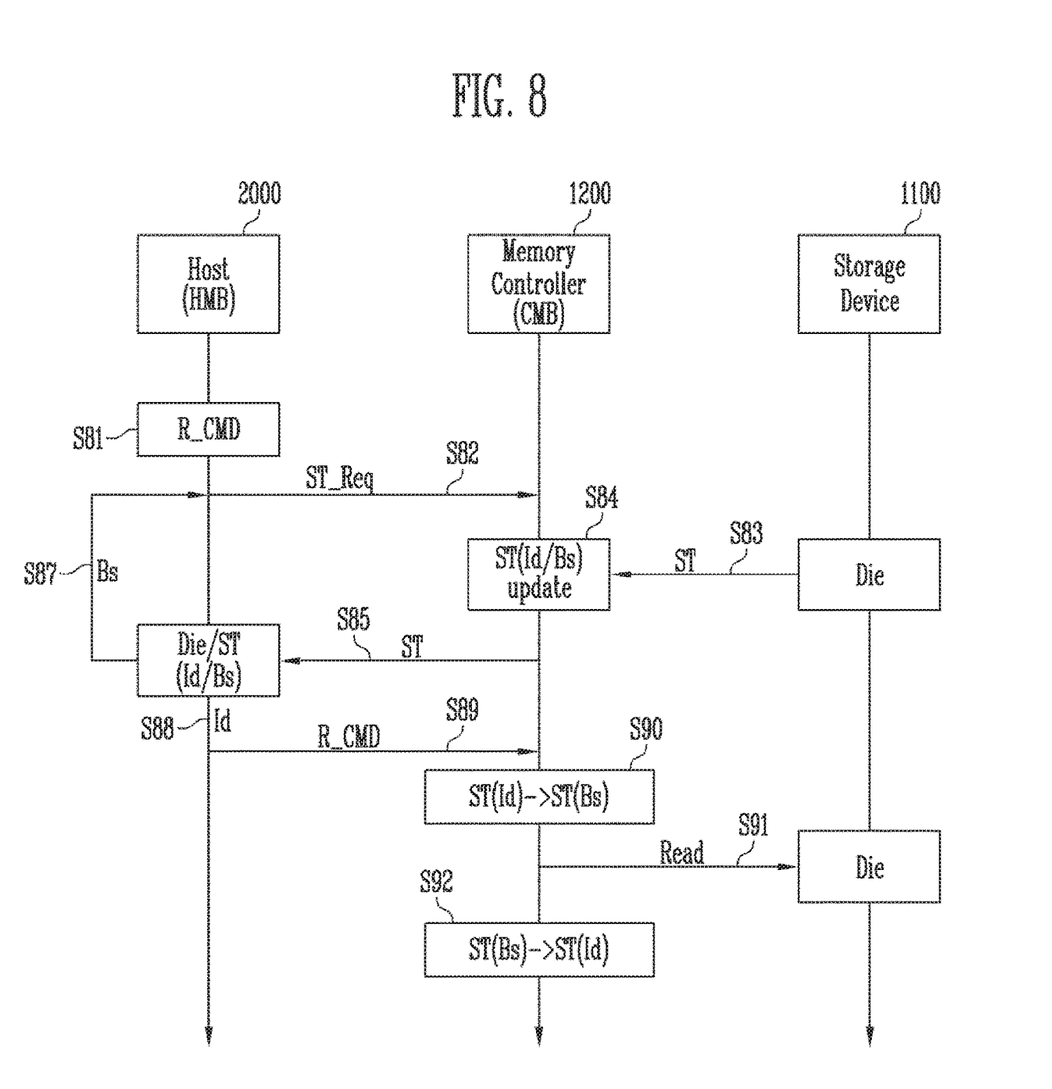
FIG. 8 is a diagram illustrating an operating method of a memory system in accordance with an embodiment of the present disclosure.

FIG. 8 is a diagram illustrating an operating method of the memory system according to an embodiment of the present disclosure.

Referring to FIG. 8, the memory controller 1200 may allow the storage device 1100 to operate in response to a program, read or erase request received from the host 2000. Hereinafter, in the embodiment, a read operation will be described as an example.

The host 2000 may generate a read external command R_CMD to be transmitted to the memory controller 1200 at step S81, and may transmit a status check request ST_Req to the memory controller 1200 at step S82.

When the status check request ST_Req is received from the host 2000, the memory controller 1200 may receive status information ST of a selected die of the storage device 1100 at step S83. For example, when a background operation such as an erase operation is performed in the selected die of the storage device 1100, the storage device 1100 may output status information ST including busy status data Bs indicating that access to the selected die is impossible at step S83. Alternatively, when the selected die is in a status in which access is possible, the storage device 1100 may transmit status information including idle status data Id of the selected die to the memory controller 1200.

The status information ST received from the storage device 1100 may be stored or updated in the CMB of the memory controller 1200 at step S84. For example, status information ST matched to the selected die may be stored in an initial status in which any status information ST matched to the selected die does not exist. When state information matched to the selected die has already existed in the CMB, the status information ST of the selected die may be updated to currently received status information ST. The status information ST may be the idle status data Id or the busy status data Bs.

The memory controller 1200 may transmit the status information ST of the selected die to the host 2000 at step S85.

The status information ST transmitted to the host 2000 may be stored in HMB at step S86. For example, the status information may be matched to the selected die to be stored in the HMB.

The host processor (2100 of FIG. 2) may transmit the status check request ST_Req or the read external command R_CMD to the memory controller 1200 according to the status information ST stored in the HMB. For example, when the status information ST matched to the selected die in the HMB includes the busy status data Bs at step S87, the selected die is currently operating. In this case, an operation cannot be performed in response to a next command although a next command is provided to the storage device 1100. Therefore, the host processor 2100 may re-transmit the status check request ST_Req to the memory controller 1200. That is, a command waiting in a command queue of the host processor 2100 is not immediately output, and the steps S82 to S87 may be repeated until the status information ST of the selected die includes the idle status data Id.

When the status of the selected die is changed from the busy status to the idle status as the operation of the selected die is ended, the status information ST including the idle status data Id may be transmitted to the memory controller 1200 in the step S83. Accordingly, in the step S84, the memory controller 1200 updates the busy status data Bs of the status information ST of the selected die to the idle status data Id.

When the status information ST including the idle status data Id is transmitted to the host 2000 in the step S85, the status information ST matched to the selected die of the HMB of the host 2000 may be updated to the status information ST including the idle status data Id. When it is determined that the idle status data Id is included in the status information ST matched to the selected die of the HMB at step S88, the host processor 2100 may transmit the read external command R_CMD waiting in the command queue to the memory controller 1200 at step S89.

When the read external command R_CMD is received, the memory controller 1200 may temporarily change the status information ST of the selected die of the CMB to the status information ST including the busy status data BS. That is, an operation corresponding to the read external command R_CMD received from the host 2000 is to be performed in the selected die, and therefore, the CPU (1210 of FIG. 3) may temporarily change the status information ST of the selected die to the busy status such that another command does not access to the selected die while the corresponding operation is being performed. That is, in order for the selected die to perform an operation requested from the host when the selected die is in the idle status, the CPU 1210 may temporarily change the status information ST matched to the selected die of the CMB to the busy status.

Subsequently, the CPU 1210 may transmit a command and an address to the selected die such that the selected die of the storage device 100 performs a read operation at step S91 in response to the read external command R_CMD received from the host 2000.

When the read operation is ended in the selected die, the CPU 1210 may re-change the status information ST matched to the selected die of the CMB to the idle status at step S92.

As described above, current status information ST of each of the dies of the storage device 1100 is stored in the host 2000, and a command is output to the host 2000 according to the stored status information ST, so that the command queue can be efficiently managed.

Figure 9:
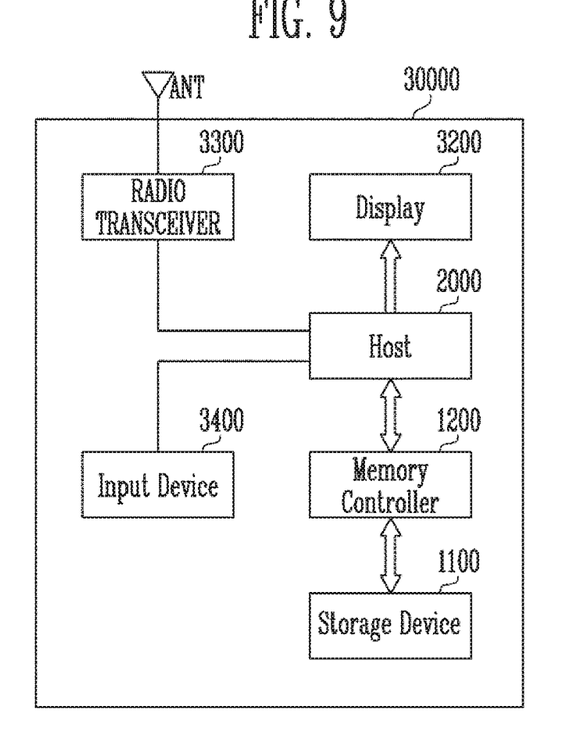
FIG. 9 is a diagram illustrating another embodiment of the electronic system including the host and the memory system, which are shown in FIG. 1.

FIG. 9 is a diagram illustrating another embodiment of the electronic system including the host and the memory system, which are shown in FIG. 1.

Referring to FIG. 9, the electronic system 30000 may be implemented as a cellular phone, a smart phone, a tablet PC, a personal digital assistant (PDA), or a wireless communication device.

The electronic system 30000 may include a storage device 1100, a memory controller 1200 capable of controlling an operation of the storage device 1100, and a host 2000 capable of controlling the memory controller 1200. The memory controller 1200 may control a data access operation of the storage device 1100, e.g., a program operation, an erase operation, a read operation, or the like under the control of the host 2000.

As described above, before the host 2000 requests the memory controller 1200 of an external command, the host 2000 may receive status information of the storage device 1100, and determine whether a memory device that is in the idle status exists in the storage device 1100, based on the status information. When it is determined that any memory device that is in the idle status does not exist, the host 2000 may allow the external command to wait until a memory device that is in the idle status is generated.

Data programmed in the storage device 1100 may be output through a display 3200 under the control of the memory controller 1200.

A radio transceiver 3300 may transmit/receive radio signals through an antenna ANT. For example, the radio transceiver 3300 may convert a radio signal received through the antenna ANT into a signal that can be processed by the host 2000. Therefore, the host 2000 may process a signal output from the radio transceiver 3300 and transmit the processed signal to the memory controller 1200 or the display 3200. The memory controller 1200 may transmit the signal processed by the host 2000 to the storage device 1100. Also, the radio transceiver 3300 may convert a signal output from the host 2000 into a radio signal, and output the converted radio signal to an external device through the antenna ANT. An input device 3400 is a device capable of inputting a control signal for controlling an operation of the host 2000 or data to be processed by the host 2000, and may be implemented as a pointing device such as a touch pad or a computer mount, a keypad, or a keyboard. The host 2000 may control an operation of the display 3200 such that data output from the memory controller 1200, data output from the radio transceiver 3300, or data output from the input device 3400 can be output through the display 3200.

Figure 10:
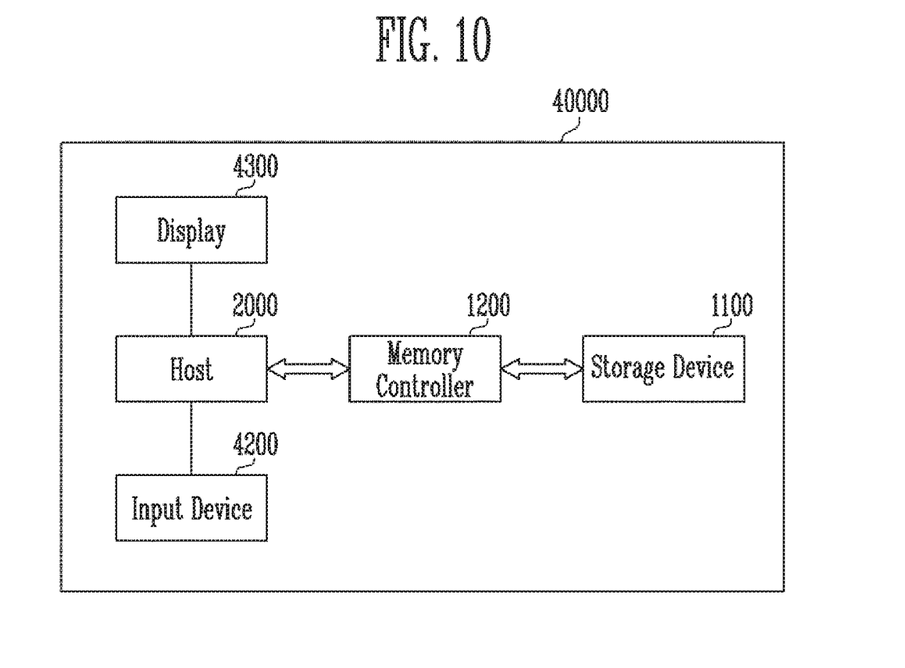
FIG. 10 is a diagram illustrating another embodiment of the electronic system including the host and the memory system, which are shown in FIG. 1.

FIG. 10 is a diagram illustrating another embodiment of the electronic system including the host and the memory system, which are shown in FIG. 1.

Referring to FIG. 10, the electronic system 40000 may be implemented as a personal computer (PC), a tablet PC, a net-book, an e-reader, a personal digital assistant (PDA), a portable multimedia player (PMP), an MP3 player, or an MP4 player.

The electronic system 40000 may include a storage device 1100, a memory controller 1200 capable of controlling a data processing operation of the storage device 1100, and a host 2000 capable of controlling the memory controller 1200.

As described above, before the host 2000 requests the memory controller 1200 of an external command, the host 2000 may receive status information of the storage device 1100, and determine whether a memory device that is in the idle status exists in the storage device 1100, based on the status information. When it is determined that any memory device that is in the idle status does not exist, the host 2000 may allow the external command to wait until a memory device that is in the idle status is generated.

The host 2000 may output data stored in the storage device 1100 through a display 4300 according to data input through an input device 4200. For example, the input device 4200 may be implemented as a pointing device such as a touch pad or a computer mouse, a keypad, or a keyboard.

The host 2000 may control overall operations of the electronic system 40000, and control an operation of the memory controller 1200.

Figure 11:
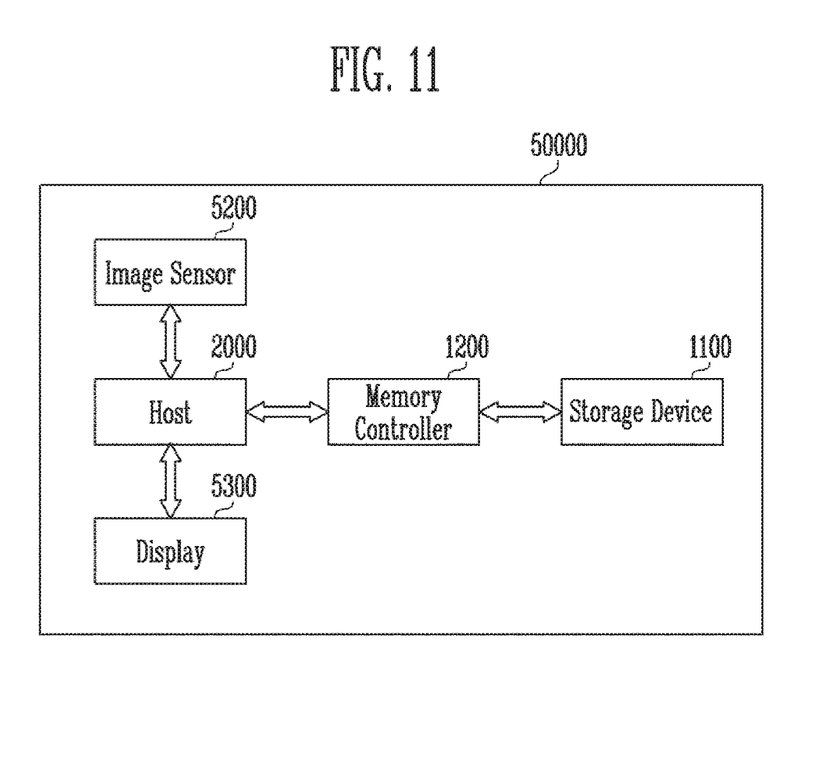
FIG. 11 is a diagram illustrating another embodiment of the electronic system including the host and the memory system, which are shown in FIG. 1.

FIG. 11 is a diagram illustrating another embodiment of the electronic system including the host and the memory system, which are shown in FIG. 1.

Referring to FIG. 11, the electronic system 50000 may be implemented as an image processing device, e.g., a digital camera, a mobile terminal having a digital camera attached thereto, a smart phone having a digital camera attached thereto, or a tablet PC having a digital camera attached thereto.

The electronic system 50000 may include a storage device 1100, a memory controller 1200 capable of controlling a data processing operation of the storage device 1100, e.g., a program operation, an erase operation, or a read operation, and a host 2000 capable of controlling the memory controller 1200.

As described above, before the host 2000 requests the memory controller 1200 of an external command, the host 2000 may receive status information of the storage device 1100, and determine whether a memory device that is in the idle status exists in the storage device 1100, based on the status information. When it is determined that any memory device that is in the idle status does not exist, the host 2000 may allow the external command to wait until a memory device that is in the idle status is generated.

An image sensor 5200 of the electronic system 50000 may convert an optical image into digital signals, and the converted digital signals may be transmitted to the host 2000. Under the control of the host 2000, the converted digital signals may be output through a display 5300, or be stored in the storage device 1100 through the memory controller 1200. In addition, data stored in the storage device 1100 may be output through the display 5300 under the control of the host 2000.

Figure 12:
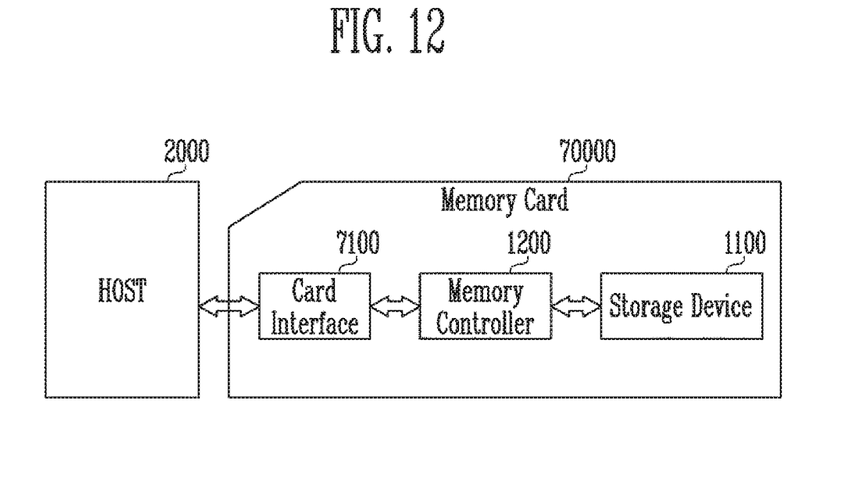
FIG. 12 is a diagram illustrating another embodiment of the electronic system including the host and the memory system, which are shown in FIG. 1.

FIG. 12 is a diagram illustrating another embodiment of the electronic system including the host and the memory system, which are shown in FIG. 1.

Referring to FIG. 12, the electronic system may include a host 2000 and a memory card 70000.

Before the host 2000 requests a memory controller 1200 of an external command, the host 2000 may receive status information of a storage device 1100, and determine whether a memory device that is in the idle status exists in the storage device 1100, based on the status information. When it is determined that any memory device that is in the idle status does not exist, the host 2000 may allow the external command to wait until a memory device that is in the idle status is generated.

The memory card 70000 may be implemented with a smart card. The memory card 7000 may include the storage device 1100, the memory controller 1200, and a card interface 7100.

The memory controller 1200 may control data exchange between the storage device 1100 and the card interface 7100. In some embodiments, the card interface 7100 may be a Secure Digital (SD) card interface or a Multi-Media Card (MMC) interface, but the present disclosure is not limited thereto. Also, the card interface 7100 may interface data exchange between the host 2000 and the memory controller 1200 according to a protocol of the host 2000. In some embodiments, the card interface 7100 may support a Universal Serial Bus (USB) protocol and an Inter-Chip (IC)-USB protocol. The card interface 7100 may mean hardware capable of supporting a protocol used by the host 2000, software embedded in the hardware, or a signal transmission scheme.

According to the present disclosure, a command queue between the host and the memory system is efficiently managed, thereby improving an operation of the electronic system.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. An electronic system comprising:
   a storage device storing data;
   a memory controller, which controls the storage device, checking a status of the storage device, and outputting status information of the storage device; and
   a host, which controls the memory controller, outputting a status check request before outputting a read command to determine the status of the storage device, and delaying or outputting the read command to the memory controller based on the status information, wherein the memory controller includes:
     a central processing unit generating a command for a read operation and outputting the command to the storage device without delaying the command when the read command is received; and
     a controller memory buffer storing the status information indicating whether the storage device is in a status in which access is possible or a status in which access is impossible,
   wherein the central processing unit outputs the status information stored in the controller memory buffer in response to the status check request, and
   wherein the host determines the status of the storage device in response to the status information, delays outputting the read command when the status information corresponds to a busy status, or outputs the read command to the memory controller when the status information corresponds to an idle status, and
   wherein the status information corresponds to the busy status when an erase operation is performed in the storage device.

2. The electronic system of claim 1, wherein the controller memory buffer stores an address of the storage device and the status information matched to the addresses.

3. The electronic system of claim 1, wherein, when the status check request is received from the host, the central processing unit:
   checks the status of the storage device and receives the status information from the storage device in response to the status check request; and
   stores or updates the status information received from the storage device in the controller memory buffer.

4. The electronic system of claim 1, wherein, when the read command is received from the host, the central processing unit:
   changes the status information of the storage device in the controller memory buffer; and
   transmits the command and an address to the storage device.

5. The electronic system of claim 4, wherein, in the controller memory buffer, the status information before being changed corresponds to the idle status, and the status information after being changed corresponds to the busy status.

6. The electronic system of claim 5, wherein, when the read operation of the storage device is ended, the central processing unit re-changes the status information to the idle status.

7. The electronic system of claim 1, wherein the host includes:
   a host memory buffer configured to store the status information which is received from the memory controller; and
   a host processor configured to determine the status of the storage device according to the status information stored in the host memory buffer.

8. An electronic system comprising:
   a storage device configured to include a plurality of dies for storing data;
   a host configured to output a status check request for checking a status of the plurality of dies, or a read command for performing a read operation to the storage device; and a memory controller configured to check the status of the plurality of dies in response to the status check request, and generate and output a command for the read operation to a selected die among the plurality of dies in response to the read command, wherein the memory controller includes a controller memory buffer configured to store status information of each of the dies and output the status information of the selected die to the host in response to the status check request received from the host, and wherein the host delays outputting the read command when an erase operation is performed in the selected die, or outputs the read command when the erase operation is finished.

9. The electronic system of claim 8, wherein the memory controller:
when the status check request is received from the host, receives the status information from the selected die; and
matches the status information to the selected die and stores the status information in the controller memory buffer.

10. The electronic system of claim 9, wherein, after the status information is stored in the controller memory buffer, the memory controller transmits the status information to the host.

11. The electronic system of claim 8, wherein the memory controller further includes an internal memory configured to store a mapping table of a logical address and a physical address.

12. The electronic system of claim 8, wherein the host includes:
a host interface configured to communicate the status check request or the read command with the memory controller;
a host memory buffer configured to store the status information received from the memory controller; and
a host processor configured to control the host interface and the host memory buffer.

13. The electronic system of claim 12, wherein the host processor allows the read command to be transmitted to the memory controller to wait or to be transmitted, based on the status information stored in the host memory buffer.

14. The electronic system of claim 13, wherein, when the read command is received from the host, the memory controller:
changes the status information matched to the selected die in the controller memory buffer; and
transmits the command and an address to the storage device such that the selected die operates.

15. The electronic system of claim 14, wherein, when the read command is received from the host,
when an idle status corresponds to the status information matched to the selected die in the controller memory buffer, the memory controller changes the status information such that a busy status corresponds to the status information.

16. The electronic system of claim 15, wherein, when the read operation of the selected die is ended, the memory controller re-changes the status information to the idle status.

17. A method for operating an electronic system, the method comprising:
outputting a status check request for checking a status of a plurality of dies, wherein the status check request is outputted from a host;
storing status information of a selected die in response to the status check request;
transmitting the status information to the host, wherein the status information is outputted from a memory controller;
when the status information stored in the host indicates that an erase operation is performed in the selected die, queuing a read command in the host to delay until the erase operation is finished in the selected die;
when the status information stored in the host indicates that the selected die is in an idle status, outputting the read command from the host to the memory controller;
changing the status information corresponding to the idle status stored in a controller memory buffer to a busy status in response to the read command, and allowing the selected die to operate; and
when the erase operation of the selected die is completed, re-changing the status information corresponding to the busy status stored in the controller memory buffer to the idle status.

18. The method of claim 17, wherein the status information:
includes busy status data when the selected die operates; and
includes idle status data when the selected die does not operate.

19. The method of claim 18, wherein the status information corresponding to the idle status is changed to the busy status when the read command is outputted to the memory controller.

20. The method of claim 18, wherein the read command is output when the status information stored in the host corresponds to the idle status.

* * * * *